United States Patent
Masuda et al.

(10) Patent No.: US 6,987,978 B2
(45) Date of Patent: Jan. 17, 2006

(54) WIRELESS COMMUNICATION RESTRICTION DEVICE, REPEATER AND BASE STATION

(75) Inventors: Noboru Masuda, Tokorozawa (JP); Takashi Yano, Tokorozawa (JP); Takeshi Kato, Akishima (JP)

(73) Assignee: Hitachi, Ltd., Tokyo (JP)

(*) Notice: Subject to any disclaimer, the term of this patent is extended or adjusted under 35 U.S.C. 154(b) by 394 days.

(21) Appl. No.: 10/337,310

(22) Filed: Jan. 7, 2003

(65) Prior Publication Data

US 2004/0203911 A1    Oct. 14, 2004

(30) Foreign Application Priority Data

Jul. 9, 2002    (JP) .............................. 2002-199388

(51) Int. Cl.
*H04M 1/00*    (2006.01)

(52) U.S. Cl. .............. 455/456.4; 455/456.5; 455/456.6; 455/565

(58) Field of Classification Search ........ 455/456.4, 455/456.1, 456.6
See application file for complete search history.

(56) References Cited

U.S. PATENT DOCUMENTS

| | | | |
|---|---|---|---|
| 3,922,685 A * | 11/1975 | Opas ........................ 342/372 |
| 6,034,987 A * | 3/2000 | Chennakeshu et al. ..... 375/133 |
| 6,243,575 B1 * | 6/2001 | Ohyama et al. ......... 455/456.4 |
| 6,393,254 B1 * | 5/2002 | Pousada Carballo et al. ... 455/1 |
| 6,421,544 B1 * | 7/2002 | Sawada ..................... 455/565 |
| 6,456,822 B1 * | 9/2002 | Gofman et al. ............... 455/1 |
| 6,643,517 B1 * | 11/2003 | Steer ...................... 455/456.4 |
| 6,687,506 B1 * | 2/2004 | Girod ..................... 455/456.4 |
| 6,832,093 B1 * | 12/2004 | Ranta ..................... 455/456.4 |
| 2004/0087318 A1 * | 5/2004 | Lipovski ................. 455/456.4 |

FOREIGN PATENT DOCUMENTS

| | | |
|---|---|---|
| JP | 11-178054 | 12/1997 |
| JP | 2000-41282 | 7/1998 |
| JP | 2001-044918 | 7/1999 |
| JP | 2001-078264 | 9/1999 |
| JP | 2001-218264 | 1/2000 |
| JP | 2001-257772 | 3/2000 |
| JP | 2001-268636 | 3/2000 |
| JP | 2001-285952 | 3/2000 |
| JP | 2001-086566 | 5/2000 |
| KR | 100288847 B1 | 11/1998 |
| KR | 1020000065875 A | 4/1999 |
| KR | 1020010083732 A | 2/2000 |

* cited by examiner

*Primary Examiner*—Nguyen Vo
*Assistant Examiner*—Julie E. Stein
(74) *Attorney, Agent, or Firm*—Reed Smith LLP; Stanley P. Fisher, Esq.; Juan Carlos A. Marquez, Esq.

(57) ABSTRACT

The disclosed invention makes mobile terminals physically impossible to use in specific spaces without using radio waves of so high intensity as to affect medical devices and without requiring telephone companies that operate wireless communications systems (WCS) to take special measures. Cooperation of a telephone company on the implementation of making mobile terminals physically impossible to use in specific spaces makes mobile terminals provided by the telephone company easy to use. Pseudo signals of downlink pilot signal in WCS are emitted off the pilot timing in specific spaces. Uplink channel radio waves in cooperative telephone compannies' WCS are relayed and communication path is disconnected if the uplink channel radio waves are for communication of an attribute banned in the space. Communication path can be disconnected without increasing the intensity of radio waves so high. In cooperative telephone compannies' WCS, only the path of communication of an attribute banned in the space is disconnected.

5 Claims, 9 Drawing Sheets

F I G. 1
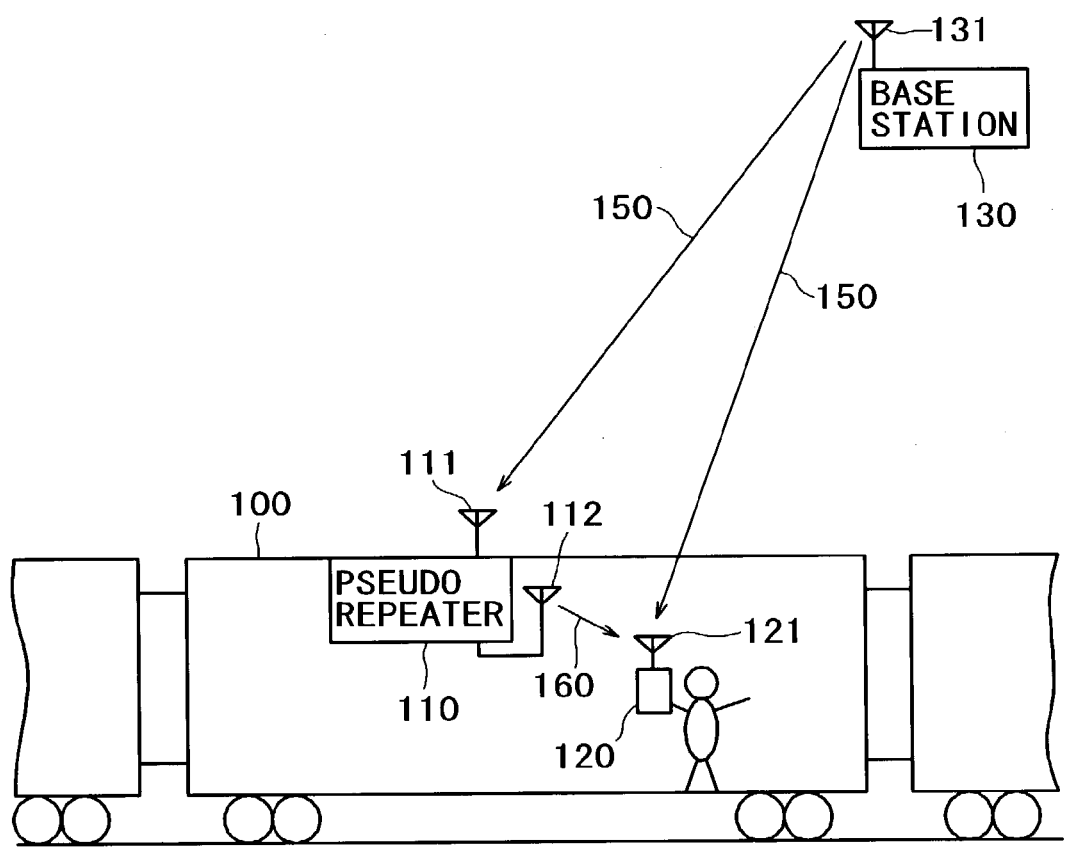

F I G. 2
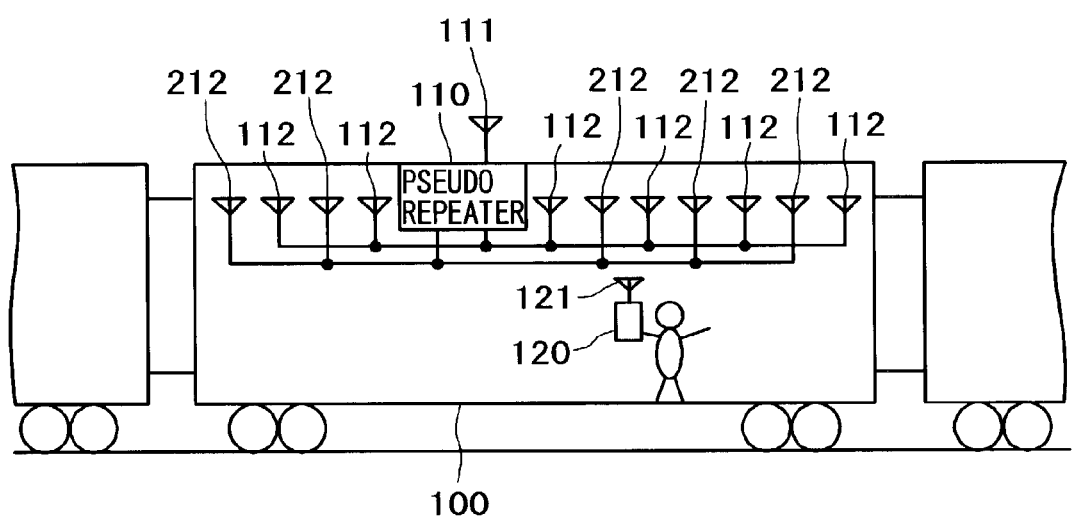

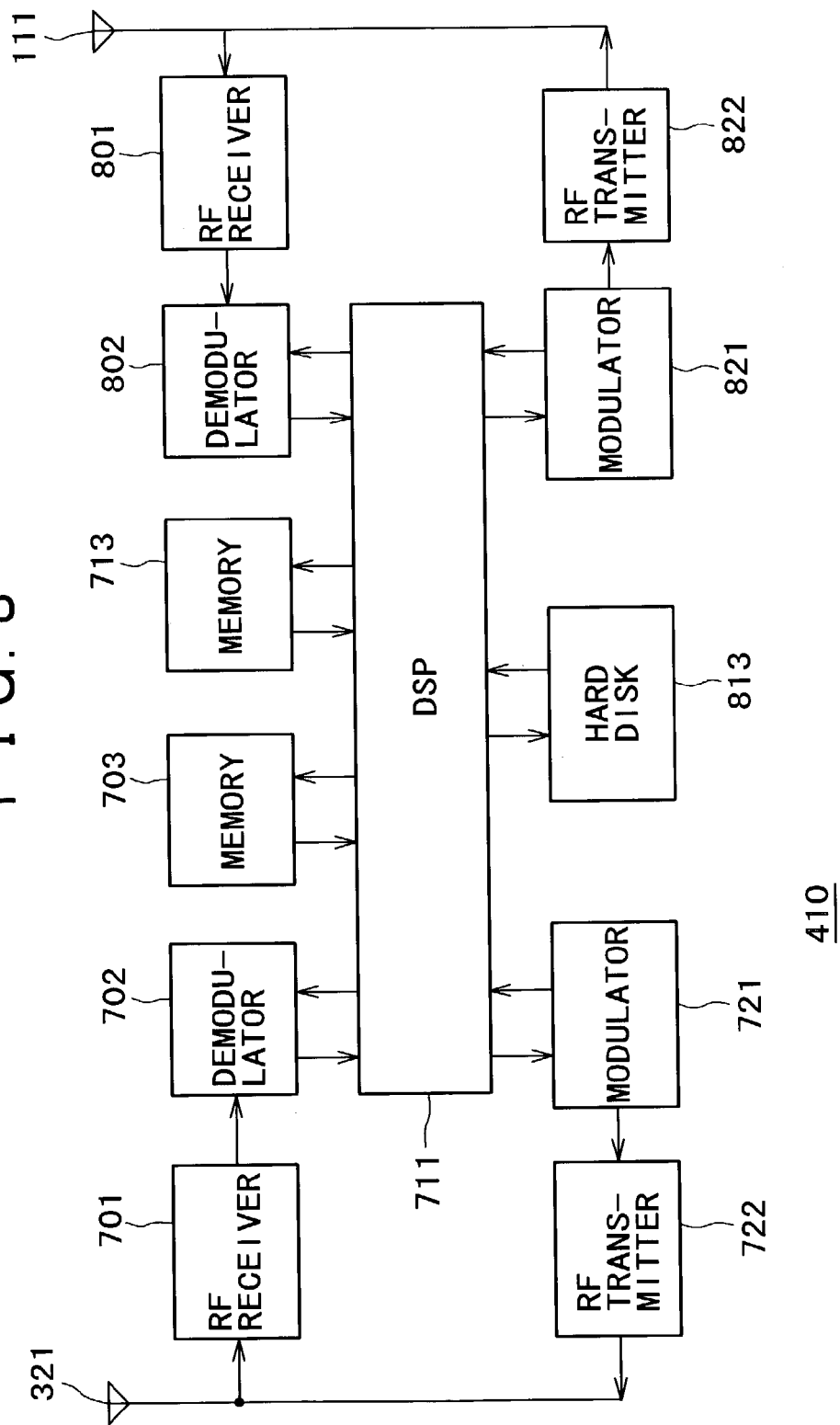

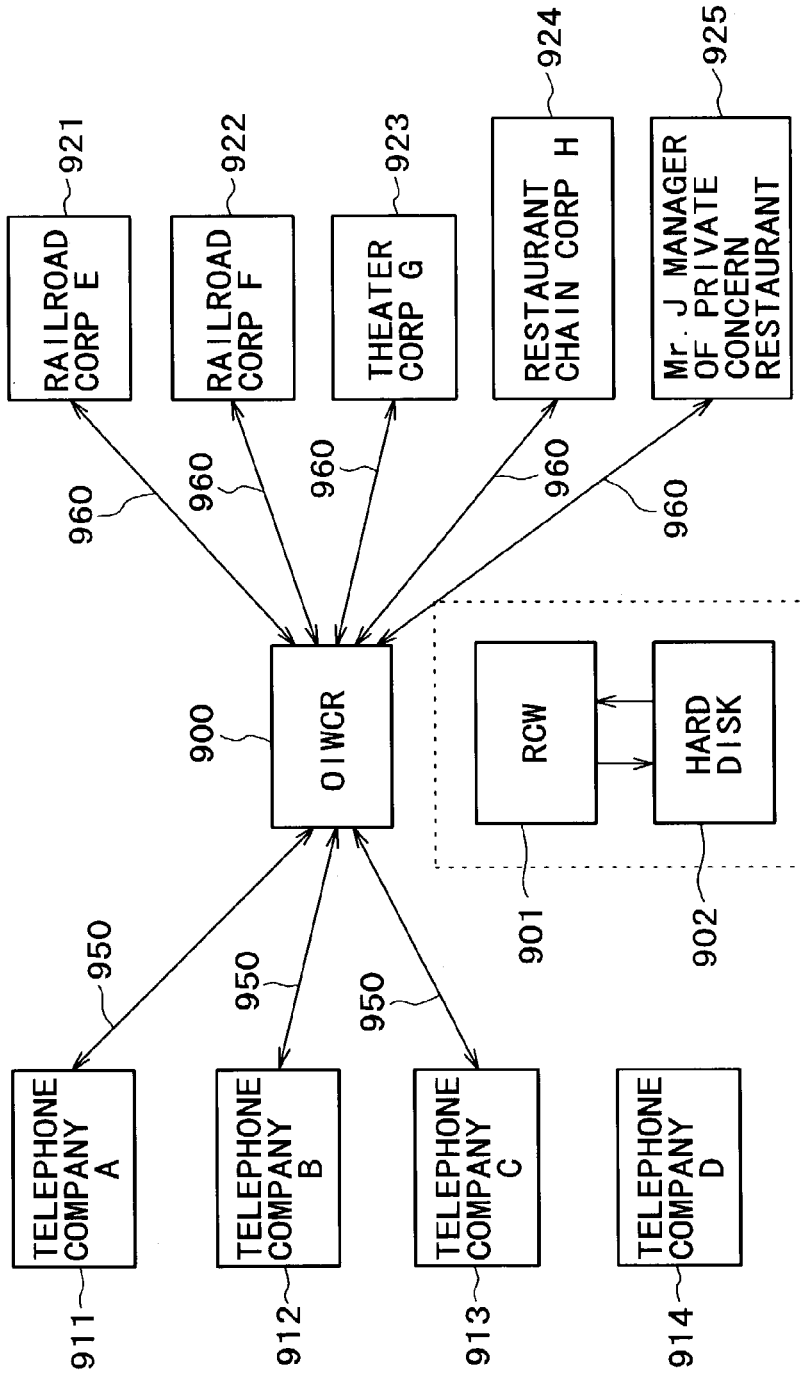

WIRELESS COMMUNICATION RESTRICTION DEVICE, REPEATER AND BASE STATION

BACKGROUND OF THE INVENTION

1. Field of the Invention

The present invention relates to equipment for cellular wireless communications with mobile phones or the like and, more particularly, to functionality of deactivating communication using a mobile phone in public places where such communication would be annoyance to others around the user of the mobile phone.

Moreover, the present invention relates to equipment for cellular wireless communications with mobile phones or the like and, more particularly, repeaters or base stations for wireless communications to enhance the quality of the wireless communications.

2. Description of Related Art

Inside public transports such as trains and buses and public places such as restaurants and theaters, where many people, strangers often gather in a limited space, the use of a mobile terminal such as a mobile phone may cause trouble when one who does not want others using a mobile phone around him or her and one who wants to use his or her mobile phone happen to be there. Particularly, for a person who wears an electronic medical device for life-support purposes, there is a possibility of the medial device being affected by radio waves sent from an operating mobile terminal around that person and the use of a mobile terminal very close to that person is a critical problem. Even for people who do not need such medical device, a nearby mobile phone talker maybe a nuisance. Therefore, the use of mobile terminals is often banned in public transports and places.

However, as long as banning the use of mobile terminals in specific places cannot be effected by physical force and is a public rule, there are, in actuality, bad-mannered mobile terminal users who ignore such rule. To effect this rule and make public transports and places more comfortable for people, it is thus necessary to make mobile phones physically impossible to perform communications in specific places.

As prior art methods for making a mobile terminal impossible to perform communications in specific places, a number of diverse methods have been disclosed in JP-A No. 178054/1999, JP-A No. 268636/2001, JP-A No. 86566/2001, JP-A No. 218264, JP-A No. 78264/2001, JP-A No. 44918/2001, JP-A No. 257772/2001, JP-A No. 285952/2001, and JP-A No. 41282.

Among them, the method disclosed in JP-A No. 178054/1999 is outlined below. Radio waves of the same frequency as the radio waves that are transmitted on a downlink radio communications channel from a base station to a mobile terminal are emitted in a specific place to interfere with the radio waves on the downlink radio channel received by the mobile terminal, thus making the mobile terminal impossible to perform communications. The method disclosed in JP-A No. 86566/2001 is outlined below. A pseudo base station is installed to send radio waves similar to radio waves on a downlink radio channel sent from a base station. When a mobile terminal comes near the pseudo base station, it is handed over to the pseudo base station so that the communication between the mobile terminal and the real base station is made impossible.

In other methods disclosed in the remaining above-mentioned patent applications, a mobile terminal is provided with specific functionality that makes it impossible to perform communications in specific places and the aim is attained by using such functionality.

With any of the above methods, the goal of making a mobile terminal impossible to perform communications in specific places can be achieved.

In the method disclosed in JP-A No. 178054/1999, radio waves interfering with the downlink radio channel from the base station make the mobile terminal impossible to receive the downlink channel. To effect this, radio waves stronger than the radio waves transmitted on the downlink radio channel from the base station must be emitted to be received by the mobile terminal. In particular, CDMA, which is expected to be popular in the future, allows for spread spectrum communications in which the effect of radio wave interference is alleviated by widespread spectrum. To bring about radio wave interference with the downlink radio channel in the CDMA communications, radio waves considerably stronger than those transmitted on the downlink radio channel from the base station must be emitted to be received by the mobile terminal. On the contrary, there would be a risk that such strong radio waves affect medical devices or the like.

The method disclosed in JP-A No. 86566/2001 is to hand over a mobile terminal to a specially installed pseudo base station. Some standards of CDMA which are now commonly used, for example, TIA/EIA/IS-95 whose standard specifications were released on May 18, 1995 and ARIB-STD-T63 whose standard specifications were released on January, 2000, prescribe the following. When a mobile terminal catches radio waves emitted by a new base station and finds that a handover to the new base station is possible, the mobile terminal sends an uplink signal message that the new base station exists to the base station to which it was connecting. After it is verified that the newly found base station can be used by the mobile terminal from the response signal from the base station, the handover is executed. Therefore, a handover to a pseudo base station not recognized by a telecommunications service provider (hereinafter, referred to as a telephone company) does not occur.

To effect the method disclosed in JP-A No. 86566/2001 for mobile terminals pursuant to the above standards, cooperation of telephone companies that operate communications systems must be obtained to make arrangements for using the pseudo base station. However, if some telephone company that does not introduce pseudo base station equipment exists, whereas other telephone companies do so, only the communications system operated by the former telephone company can be used by mobile terminals in specific places. In consequence, the telephone companies that introduce such equipment suffer a loss. For other methods disclosed in other patent applications mentioned above, a special function must be added to mobile terminals. Therefore, to effect these methods, arrangements for such function must be made by the telephone companies that operate communications systems.

SUMMARY OF THE INVENTION

It is a first object of the present invention to avoid the emission of so strong radio waves as to affect medical devices or the like when making a mobile terminal physically impossible to use in a specific space.

It is a second object of the present invention to provide means for making mobile terminals physically impossible to use in a specific space, wherein the purpose of the above means can be achieved even if cooperation of some telephone company cannot be obtained.

It is a third object of the present invention to provide means for making mobile terminals easy to use in the communications system operated by a telephone company that cooperates in making mobile terminals physically impossible to use in a specific space.

According to the present invention, mobile terminals are made physically impossible to use in specific spaces without increasing the intensity of radio waves so high as to affect medical devices or the like.

According to the present invention, mobile terminals are made physically impossible to use in specific spaces even if some telephone company that operates a communications system does not cooperate on wireless communication restrictions.

According to the present invention, cooperation of a telephone company on the implementation of making mobile terminals physically impossible to use in specific spaces makes mobile terminals provided by the telephone company easy to use.

To achieve the foregoing first and second objects of the invention, a wireless communication restriction device according to the present invention emits radio waves carrying signals similar to a reference phase signal (normally called a pilot signal) transmitted on a downlink radio channel for use in wireless communications to a mobile terminal that is to be made impossible to use in a space where the mobile terminal to be made impossible to use exists. To achieve the foregoing third object of the invention, the wireless communication restriction device according to the present invention comprises, in combination, means for receiving in advance information about on-going communication between a mobile terminal and a base station run by a telephone company that is cooperative from the base station and sending the base station a signal of request to discontinue the communication upon the reception of radio waves on an uplink radio channel from the mobile terminal engaged in some kind of communication for which mobile terminal use is banned in a specific space and means for emitting radio waves carrying signals similar to the downlink channel pilot signal for use in wireless communications provided by a telephone company that is not cooperative in the above space. To achieve the third object of the invention, the wireless communication restriction device also includes means for relaying radio waves for communication that is not banned in a specific space between the mobile terminal and the base station run by the cooperative telephone company, thereby enhancing the communication quality.

According to another aspect of the present invention, the invention provides a method for restricting wireless communications between a base station and a mobile terminal in a specific space. This method comprises the step of installing a wireless communication restriction device which restricts wireless communications in the specific space, the step of installing a repeater which relays radio waves for communication between a mobile terminal and a base station in the specific space, and the step of arranging the repeater to keep the communication on between a mobile terminal and a particular base station without regard to restriction on wireless communications placed by the wireless communication restriction device. In an illustrative application, the wireless communication restriction device emits pseudo pilot signals to be transmitted in slightly different time steps off the timing of the pilot signal that is sent from the base station to a mobile terminal, thereby interfering with channel synchronization between the mobile terminal and the base station and banning the wireless communications therebetween.

In the present invention, the wireless communication restriction device is able to restrict wireless communications independently in a specific space. In a specific space, for example, inside a train, theater, hospital, and the like, where the use of a mobile terminal or the like may annoy people around it or there is a fear that the operation of a mobile terminal affects a nearby medical device, a person who manages the space can manage wireless communication within that space.

In another illustrative application, the repeater can be arranged to relay data communication radio signals, but not to relay voice communication radio signals. For example, in a tearoom, where a mobile phone talker is annoyance, but transmitting and receiving e-mail messages with a mobile phone or terminal cause no problem, this application is useful.

In a further illustrative application of the present invention, the invention provides a method for restricting wireless communications between a base station and a mobile terminal in a specific space. This method comprises the step of emitting pseudo pilot signals to be transmitted in slightly different time steps off the timing of a pilot signal that is sent from a first base station, thus restraining a mobile terminal from communicating with the first base station, and the step of relaying radio waves for communication between a second base station and a mobile terminal and restraining a mobile terminal from communicating with the second base station in the specific space, according to the kind of communication.

In this illustrative application, such a method of controlling communications can be implemented that the manager of a specific space such as, for example, the space in a train, a theater, or a hospital bans communication with the first base station completely and bans communication with the second base station conditionally, that is, permits acceptable kinds of communication and bans unacceptable kinds of communication. To determine whether to relay radio signals from a mobile terminal to the second base station, according to the kind of communication, it is convenient to obtain control information about the communication from the communications service provider running the second base station.

BRIEF DESCRIPTION OF THE DRAWINGS

FIG. 1 is a conceptual diagram illustrating a preferred embodiment of the present invention;

FIG. 2 is a conceptual diagram illustrating another preferred embodiment of the present invention;

FIG. 8 is a block diagram illustrating a further detailed configuration of one component used in the embodiment of FIG. 4; and FIG. 9 is a conceptual diagram for explaining a method of coordinating contracts and relations required to carry out the present invention.

DETAILED DESCRIPTION OF THE PREFERRED EMBODIMENTS

Figure 3:
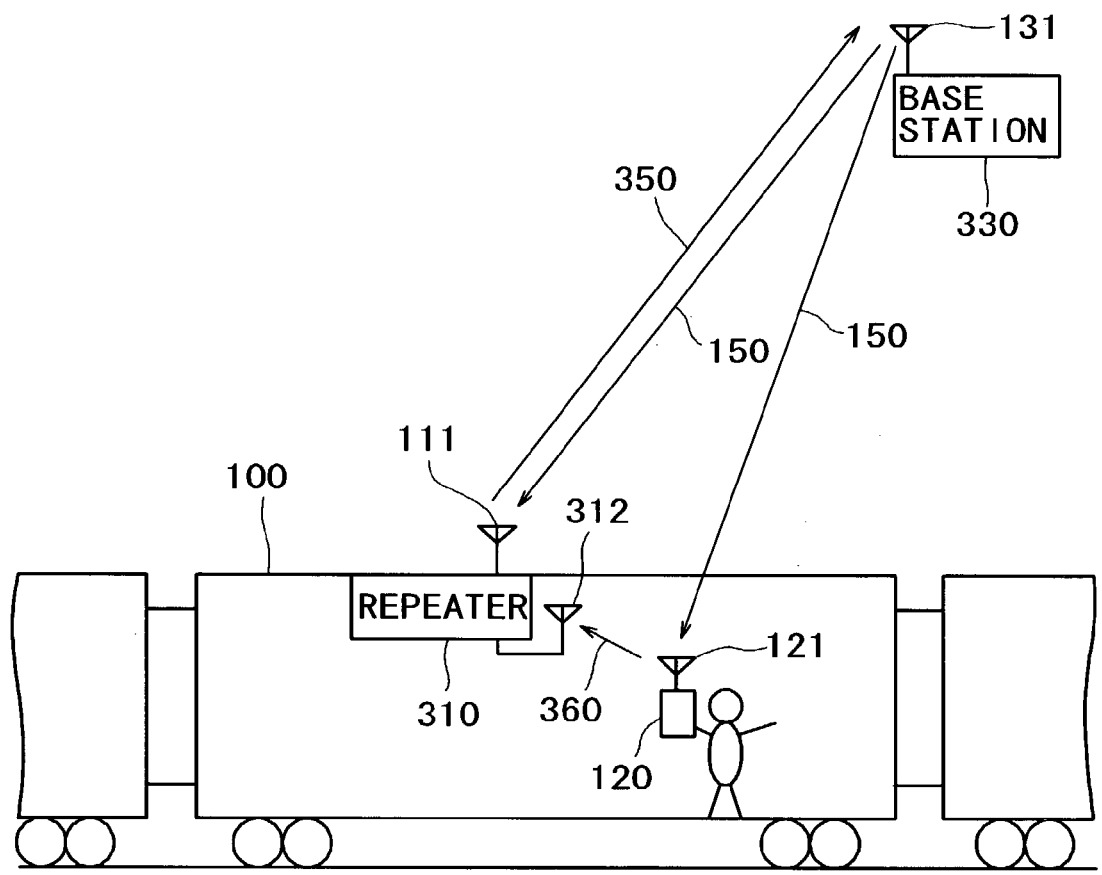
FIG. 3 is a conceptual diagram illustrating yet another preferred embodiment of the present invention.

A preferred embodiment of the present invention will now be described, using FIG. 1. This embodiment is to explain means for making a mobile terminal impossible to use inside a coach of a train in a wireless communications system operated by a telephone company without requiring the telephone company to take special actions and measures.

As is shown in FIG. 1, reference numeral 100 denotes a coach of a train, 120 denotes a mobile terminal in the coach, 130 denotes a base station that is located near the train and communicable with the mobile terminal 120. A pseudo repeater 110 of the present invention is installed within the coach 100. The pseudo repeater 110 has two antennas: one 112 positioned inside the coach 100 and the other 111 positioned outside the coach. The mobile terminal 120 has an antenna 121 and the base station 130 has an antenna 131. Reference numeral 150 denotes a downlink radio channel of radio waves sent from the base station 130 and 160 denotes a pseudo downlink radio channel of radio waves sent from the pseudo repeater 110. The pseudo repeater 110 receives radio waves on a downlink radio channel 150 sent from the base station 130 and detects a signal required for synchronizing with that channel (hereinafter referred to as a pilot signal) out of the radio signals carried by the downlink radio channel 150. The pseudo repeater generates several pseudo pilot signals having the same pattern as the pilot signal, but to be transmitted in slightly different time steps off the timing of the pilot signal and sends radio waves carrying these pseudo pilot signals on the pseudo downlink radio channel 160 from the indoor antenna 112. When the train runs and goes away from the base station 130, radio waves transmitted on the downlink radio channel 150 from the base station 130 do not arrive at the antenna 111. However, the pseudo repeater is arranged to continue to send the pseudo pilot signals of the same pattern as the pilot signal from the base station 130 for a while after the downlink channel disconnection from the base station. When the pseudo repeater receives new radio waves transmitted on a downlink radio channel from another base station, it detects a pilot signal out of the radio waves and sends several pseudo pilot signals to be transmitted in slightly different time steps off the timing of the pilot signal, superimposing them on the pseudo pilot signals that it has been sending.

When the base station 130 is very near the mobile terminal 121, radio waves transmitted on the primary downlink radio channel 150 arrives at the antenna 121 of the mobile terminal with the power strong enough to ensure communication between the base station 130 and the mobile terminal 120. As the train runs and the mobile terminal 120 goes away from the base station 130, however, the received power of the radio waves on the downlink radio channel 150 lessens. When the received power of the pilot signal of the radio waves becomes less than the received power of the pseudo pilot signals carried on the pseudo downlink radio channel 160 received by the antenna 121, the mobile terminal 120 starts to synchronize with the pseudo pilot signals 160. Then, the synchronization with the downlink radio channel 150 from the base station 130 is lost.

If the train runs at 60 km/h or higher, it travels 200 meters or more for 12 seconds. Even if the base station 130 is now very near the mobile terminal 120, about 12 seconds after, the mobile terminal will be 200 meters or more away from the base station. The received power of the radio waves on the downlink radio channel 150 or the pseudo downlink radio channel 160 received by the antenna 121 is approximately in inverse proportion to a square of the distance between the antenna 131 or the antenna 112 and the antenna 121. Hence, if the antenna 121 of the mobile terminal is positioned within a small distance, for example, two meters from the antenna 112 of the pseudo repeater, even if the transmission power of the pseudo pilot signals sent from the antenna 112 of the pseudo repeater is about one ten thousandth (1/10,000) of the transmission power of the pilot signal sent from the antenna 131 of the base station, when the train has run for at least 12 seconds since the time when the mobile terminal 120 is nearest to the base station 130, the received power of the pilot signal becomes smaller than the received power of the pseudo pilot signals and the mobile terminal 120 loses the synchronization with the downlink radio channel 150 from the base station 130.

Meanwhile, when the mobile terminal 120 is put in a standby state, the radio waves transmitted on the downlink radio channel 150 from the base station 130, normally, do not include signals addressed to the mobile terminal 120, other than the pilot signal. Thus, even if the mobile terminal 120 enters a state that it can receive only the radio waves on the pseudo downlink radio channel 160 comprising only pseudo pilot signals, it does not find that it has become unable to receive the radio-waves on the downlink radio channel 150 from the base station 130. When the mobile terminal 120 is put in the standby state, it does not send radio waves on an uplink radio channel and, therefore, the base station 130 also cannot find that the mobile terminal 120 has become unable to receive the radio waves on the downlink radio channel 150. In this state, even if the base station 130 sends a downlink signal to call the mobile terminal 120, the mobile terminal 120 cannot receive the signal because the synchronization with the base station 130 has been lost. If the mobile terminal 120 sends an uplink signal to call the base station 130, even if the base station 130 can receive the signal, the base station 130 cannot control the mobile terminal 120 because the mobile terminal 120 cannot receive a downlink signal from the base station 130. Thus, no matter which end attempts to call the other, the communication between the mobile terminal 120 and the base station 130 is disabled.

Then, assume a case that the mobile terminal 120 is very near the base station 130 and put in a communication-on state and, as the train runs and goes away from the base station 130, the received power of the pilot signal lessens and becomes equal to or less than the received power of the pseudo pilot signals. In this case, errors of reception at the mobile terminal 120 increase and, consequently, the mobile terminal 120 seeks a downlink radio channel from another base station and attempts a handover. However, in most cases, the pseudo repeater 110 becomes able to receive radio waves on the downlink radio channel earlier than the mobile terminal 120 does because the antenna 111 of the pseudo repeater 110 is located outside and the antenna 121 of the mobile terminal 120 is inside the coach 100. That is, in most cases, before the mobile terminal 120 becomes able to receive the downlink radio channel from another station, the pseudo repeater 110 sends pseudo pilot signals of the same pattern as the pilot signal transmitted on the downlink radio channel sent from the base station. Thus, it is likely that the mobile terminal 120 seeks out the pseudo pilot signals sent by the pseudo repeater 110 before seeking out the pilot signal from another base station. In consequence, a handover of the mobile terminal 120 to another base station is disabled and the communication will be disconnected.

In other words, the mobile terminal 120 being within about two meters from the indoor antenna 112 becomes substantially impossible to use.

Another preferred embodiment of the invention is shown in FIG. 2. In this embodiment, a multiplicity of indoor antennas is installed inside the coach 100. These indoor antennas are divided into two groups; one group is identified by reference numeral 112 and the other group by reference numeral 212. Each antenna in the group 112 sends radio waves on the pseudo downlink radio channel which is the same as in the embodiment of FIG. 1. Each antenna in the group 212 sends radio waves on the same downlink radio channel in on and off cycles. Other constituent parts of the invention are the same as shown in the embodiment of FIG. 1.

To install the multiplicity of indoor antennas 112 makes it possible that, at almost any position throughout the inside space of the coach 100, at least one indoor antenna 112 exists within about two meters of the position. When these antennas send the same radio waves at the same time, however, the radio waves weaken by interference at some point. At that point, the received power of the radio waves on the pseudo downlink radio channel weakens and the effect of the present invention cannot be obtained sufficiently.

To overcome this disadvantage, in the embodiment of FIG. 2, the antennas 212 are installed between the antennas 112 and sending the radio waves on the pseudo downlink radio channel from the antennas 212 is turned on and off in a cycle of about one millisecond. In consequence, the point where the received power of the radio waves on the pseudo downlink radio channel moves in a cycle and, by averaging for about one millisecond or more, the radio waves on the pseudo downlink radio channel can be received at substantially all points. Thus, according to the embodiment of FIG. 2, the mobile terminal 120 is made impossible to use substantially throughout the entire space inside the coach 100.

In the embodiment of FIG. 2, instead of sending the radio waves on the pseudo downlink radio channel from the antennas 212 in on and off cycles, it is possible to turn the power of the radio waves high and low in a cycle, which produces the same effect. In the alternative, it may be also possible to send the radio waves of given power, while changing the phase in a cycle. It may be also possible to set a carrier frequency difference of about 1 kHz between the radio waves on the pseudo downlink radio channel sent from the antennas 212 and those sent from the antennas 112. In either case, a point where the radio waves on the pseudo downlink radio channel sent from the antennas 212 and those sent from the antennas 112 cancel each other and weaken and another point where both radio waves are added to become more powerful are replaced with each other in a cycle of about 1 kHz, and therefore, the same effect as described above is obtained.

Yet another preferred embodiment of the invention is shown in FIG. 3. This embodiment assumes that cooperation of a telephone company that operates the wireless communications system in restricting the use of mobile terminals in a specific space is obtained. Attributes of communication in which the mobile terminal 120 is engaged are given and the mobile terminal is made impossible to use for only communication of some kind for which its use has been determined to be banned in the coach of the train.

As is shown in FIG. 3, reference numeral 310 denotes a repeater, 312 denotes an indoor antenna of the repeater, 330 denotes a base station provided with additional special functions, 360 denotes an uplink radio channel of radio waves from the mobile terminal 120 to the repeater 130 and 350 denotes an uplink radio channel of radio waves from the repeater 310 to the base station 330. The base station 330 broadcasts telephone numbers, information required for receiving an uplink pilot signal, and information about communication attributes for all mobile terminals that it is communicating with to the repeater 310 installed in each coach of the train. The attributes as used herein include types of communication to discriminate between voice and data communications, an indicator of whether the terminal user is communicating or going to communicate with a particular party (for example, police) for some reason that is regarded as emergent and important, and an indicator of whether on-going communication continues, exceeding a predetermined time. The repeater 310 installed in each coach of the train selects some kind of communication for which the use of mobile terminals has been determined to be banned in the train, using the above information broadcasted from the base station 330. The repeater keeps monitoring the radio waves received by the indoor antenna 312 to see whether an uplink pilot signal for the selected kind of communication is included in the radio waves. When the repeater detects an uplink pilot signal for communication for which the use of mobile terminal has been determined to be banned, it sends the base station 330 a signal of request to discontinue that communication. Having received this request, the base station 330 discontinues that communication.

According to this embodiment, not only completely banning the use of a mobile terminal inside the train coaches, it is also possible to set conditions for banning the use of a mobile terminal; for example, banning voice communications only, but permitting data communications, permitting only the kind of communication that is regarded as emergent and important, permitting only short communication within a predetermined time, and combination of the above. It is also possible to set different conditions for each coach of the train. In some implementation, it may be also possible to inform the mobile terminal user of disconnection and its rules when discontinuing the communication for which the use of mobile terminals has been determined to be banned, using synthesized voice if the mobile terminal is engaged in voice communication or a visual message if the mobile terminal is engaged in data communication. When getting on a train, one may select a coach where communication by mobile terminals is completely disabled or a coach where some kind of communication for which the user wants to use the mobile terminal is permitted.

Information about the mobile terminals being communicating with the base station 330 is broadcasted such that the information about all mobile terminals is sent periodically, for example, every about 10 seconds, and change to the information is sent at shorter intervals. Thereby, the quantity of information to be sent from the base station 330 does not increase much and the repeaters 310 installed in the coaches can get information about the latest state of communication that is being performed near them. If information is encrypted and broadcasted, description keys to decrypt the information must be set in the repeaters 310 in all coaches beforehand so that simultaneous broadcasting to all coaches can be performed.

The cooperative telephone company can use the repeater 310 to relay radio waves on the uplink radio channels in the wireless communications system run by it. That is, the repeater receives radio waves in a frequency band of the uplink radio channel 360 by the indoor antenna 312 and amplifies and sends the radio waves on the uplink radio channel 350 from the outside antenna 111. Thus, the radio waves on the uplink radio channel 360 sent by the mobile terminal 120 should have power enough to arrive at the indoor antenna 312 and smaller power is required than in environment without the repeater 310. The range within which the radio waves on the uplink radio channel 360 sent by the mobile terminal 120 affects medical devices or the like around it can be narrowed. Moreover, power consumption of the battery of the mobile terminal 120 can be reduced.

In this case, to prevent the outside antenna 111 from being received by the indoor antennas 312 of the same coach and the preceding and following coaches, the shape and material of the roofs of the coaches and the installation positions of the external antenna 111 and the indoor antennas 312 should be taken in consideration in designing a rate of amplification of the radio waves that are amplified by the repeater 310 and transmitted on the uplink radio channel.

When two trains approach each other when passing by each other or one train passes on the side of the other train, radio waves on the uplink radio channel 350 sent from the outside antenna 111 of the first train may be received by the indoor antenna 312 of the second train. In this case, the following may occur. If a mobile terminal inside the first train is engaged in communication of an attribute that is permitted in the first train, but banned in the second train, the permitted communication is discontinued in consequence of that the repeater 310 of the second train sends the base station 330 a signal of request to discontinue the communication. If the radio waves on the uplink radio channel 350 sent from the outside antenna 111 of the first train are received by the indoor antenna 312 of the second train and the radio waves on the uplink radio channel 350 sent from the outside antenna 111 of the second train are received by the indoor antenna 312 of the first train, oscillation may take place between the repeaters 310 of both trains.

To avoid this, the repeater 310 superimposes a particular signal that is not sent by the mobile terminal 120 on the radio waves on the uplink radio channel 350 and sends the radio waves from the external antenna 111. The repeater 310 is set not to send the base station 330 a signal of request to discontinue the communication when its indoor antenna 312 has received the particular signal. The rate of amplification of the radio waves that are amplified by the repeater 310 and transmitted on the uplink radio channel is to decrease when the indoor antenna has received the particular signal. In this way, the above-noted problem can be prevented when two trains approach each other.

If some telephone company is cooperative, whereas another telephone company is not cooperative in restricting the use of mobile terminals in a specific space, the embodiment of FIG. 1 or FIG. 2 and the embodiment of FIG. 3 should be carried out together. Mobile terminals operating in the communications system operated by the telephone company that is not cooperative are made impossible to use completely in any coach of the train, according to the embodiment of FIG. 1 or FIG. 2. Mobile terminals operating in the communications system operated by the telephone company that is cooperative are made impossible conditionally; that is, banning or permitting the use of a mobile terminal is set depending on the attribute of communication for which it is used and this setting may change for each coach of the train, according to the embodiment of FIG. 3. If all telephone companies in the area where the train runs are cooperative in restricting the use of mobile terminals in the coaches of the train, the installations for the embodiment of FIG. 1 or FIG. 2 are not necessary.

Figure 4:
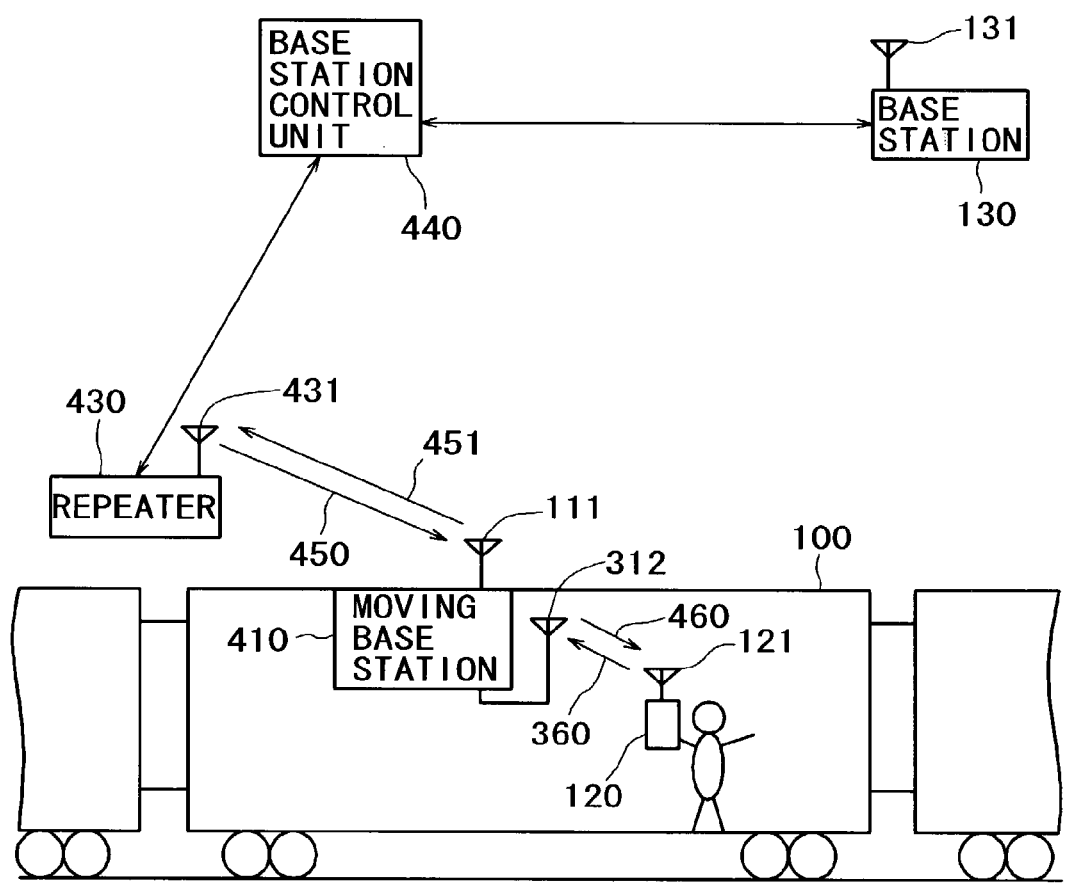
FIG. 4 is a conceptual diagram illustrating a further preferred embodiment of the present invention.

A further preferred embodiment of the invention is shown in FIG. 4. This embodiment also assumes that cooperation of a telephone company that operates the wireless communications system in restricting the use of mobile terminals in a specific space is obtained.

As is shown in FIG. 4, reference numeral 410 denotes a moving base station installed inside the coach 100, 440 denotes a base station control unit, 430 denotes a repeater located to link the moving base station 410 to the base station control unit 440, 450 denotes a downlink radio channel of radio waves from the repeater 430 to the moving base station 410, 451 denotes an uplink radio channel of radio waves from the moving base station 410 to the repeater 430, and 460 denotes a downlink radio channel of radio waves from the moving base station 410 to the mobile terminal 120.

The moving base station 410 is provided with the same functions as the base station 130 and the mobile terminal 120 that has entered the coach 100 from the outside is handed over from the base station 130 to the moving base station 410. When the mobile terminal 120 is powered on inside the coach 100, it is initialized by interaction with the moving base station 410.

The moving base station 410 is provided with the following functionality. When the mobile terminal 120 is initiating communication of an attribute for which its use is banned inside the coach 100 or a mobile terminal that is engaged in communication of an attribute for which its use is banned inside the coach 100 is handed over to the moving base station, the moving base station notifies the mobile terminal user of disconnection by a voice or visual message and discontinues the communication.

The moving base station 410 is controlled by the base station control unit 440 as the normal base station 130 is done, but communication between the base station control unit 440 and the moving base station is performed via the repeater 430. Communication between the repeater 430 and the moving base station 410 is performed in the same way that communication is performed between the normal base station 130 and the mobile terminal 120 in common environment (where the installations by the present invention do not exist).

A plurality of antennas 111 of the moving base station 410 can be installed on the top of the train coach. Thus, the antenna(s) 111 can receive radio waves and send radio waves in the air more efficiently than the antenna 121 of the mobile terminal 120 inside the coach 100. The antenna 431 of the repeater 430 should be installed in a place where efficient communication is possible, considering the route of the train run, and can be installed on the inner wall of a tunnel or the like. Thus, communication can be made possible even if the train runs in circumstances where radio waves from the normal base station 130 cannot reach.

Furthermore, it is also possible to install large capacity storage such as hard disks in the moving base station 410 and send information of a high access frequency to the moving base station 410 beforehand. This can increase the efficiency of use of radio waves.

Figure 5:
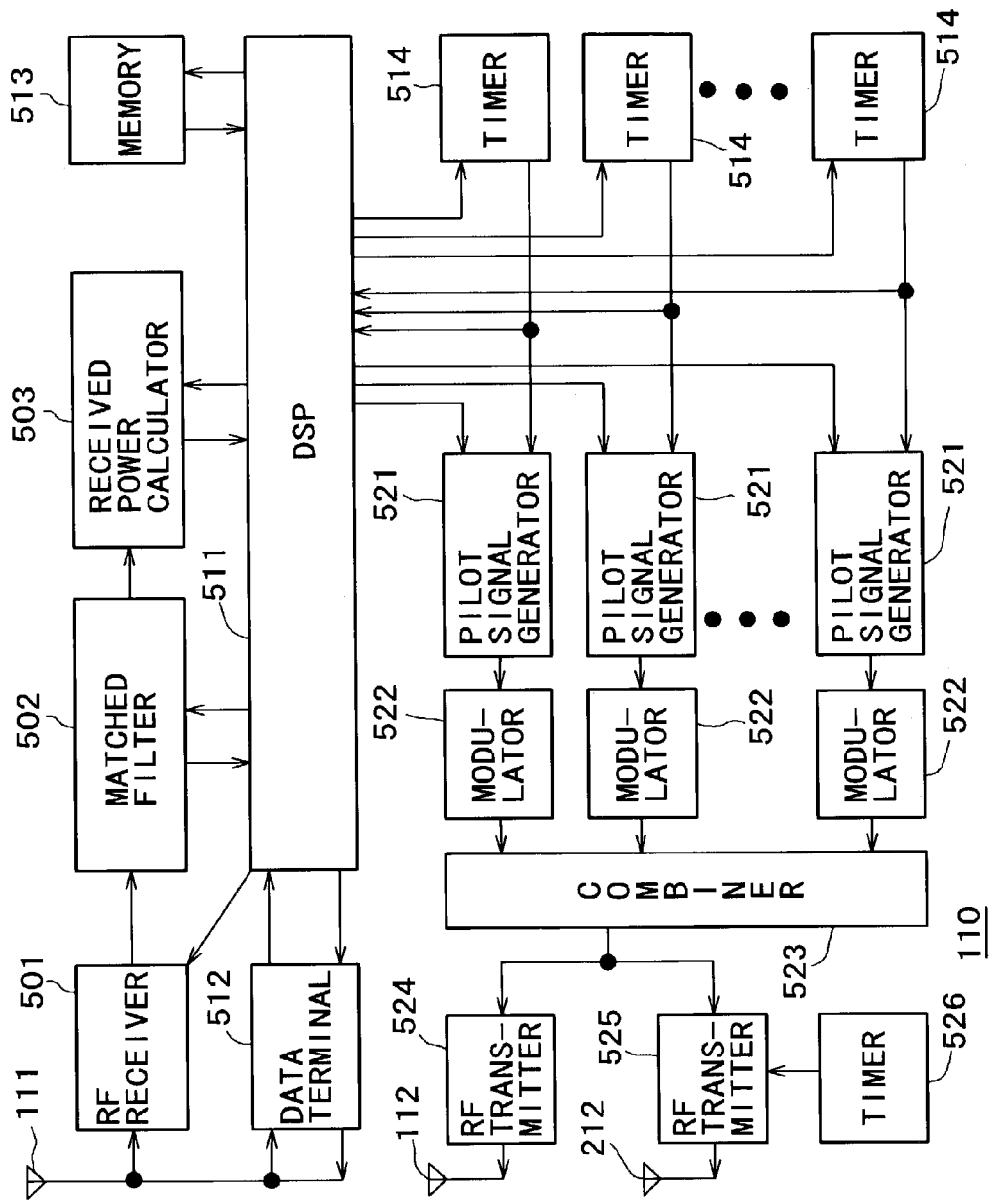
FIG. 5 is a block diagram illustrating a further detailed configuration of one component used in the embodiment of FIG. 1 or FIG. 2.

A preferred embodiment of configuring the pseudo repeater 110 is shown in FIG. 5. As is shown in FIG. 5, reference numeral 501 denotes a radio frequency (hereinafter abbreviated to RF) receiver, 502 denotes a matched filter, 503 denotes a received power calculator, 511 denotes a digital signal processor (hereinafter abbreviated to DSP), 512 denotes a data terminal, 513 denotes a memory, 514 denotes a timer for setting pilot signal timing, 521 denotes a pilot signal generator, 522 denotes a modulator, 523 denotes a combiner, 524 denotes an RF transmitter for transmitting at given power, 525 denotes an RF transmitter for transmitting, while making phase change in a cycle, and 526 denotes a timer for determining phase change timing.

The data terminal 512 is used for remotely operating the pseudo repeater 110 and may be either a data terminal of a commercial wireless communication system operated by a telephone company or the like or a data terminal of a private wireless communications system used by a railroad corporation or the like, which can be used only in a major railroad station or a car barn.

The pseudo repeater 110 has the following functions: storing various kinds of information about a wireless communications system in which the use of mobile terminals is to be banned inside the, coach 100 (hereinafter referred to as a system wherein banning applies) into the memory 513; seeking a downlink pilot signal sent from a base station in the system wherein banning applies; sending pseudo pilot signals of the same pattern as the pilot signal detected by seeking in time steps off the pilot signal timing inside the coach 100; and sending information about the detected downlink pilot signal to the remote control station.

Assuming that the system wherein banning applies is a wireless communications system pursuant to standards described in the standard specifications of ARIB-STD-T63 (hereinafter referred to as WCDMA standards), which was mentioned in the "Description of Related Art" section of the present specification, by way of illustration, the operation of the pseudo repeater will be described. If the system wherein banning applies is a wireless communications system pursuant to other standards, parameters should be set in compliance with the standards and mobile terminals in the system can be made impossible to use in the same way.

First, information required for receiving a downlink pilot signal for use in the system wherein banning applies and generating pseudo pilot signals is stored into the memory 513 via the data terminal 512 and DSP 511. The information comprises specifications such as one chip time (that is, a minimum unit of time of signal change) as per WCDMA standards, primary synchronization code, secondary synchronization code, downlink scrambling code, channelization code of primary common pilot channel, and modulation patterns of the antennas, the frequencies of radio waves on the downlink radio channels, thresholds of power by which the reception of a downlink pilot signal and the reception of primary and secondary synchronization signals are determined, etc. Such information can be stored as a part of a program for making the DSP 511 operate or a part of parameters to be referenced by the program.

Then, the DSP sets the timer 514. By the WCDMA standards, one chip time is about 260 nanoseconds. After selecting an empty timer 514, thus, the DSP sets the timer to output a first pulse at intervals of about 260 nanoseconds. When pilot seeking is performed in the system wherein banning applies, as per WCDMA standards, this first pulse is used as a clock signal in one chip time steps.

By the WCDMA standards, the downlink scrambling code repeats in a cycle of 38400 chips. Thus, the DSP sets the timer 514 to output a second pulse every 38400 chips. Timing of start of diverse signal frames can be given by the number of chips relative to the reference second pulse.

If one timer 514 has been put into operation and set to output the first and second pulses at the same intervals as mentioned above, the DSP uses that timer in a shared manner. Then, the DSP sets the RF receiver 501 to extract a range of frequencies of radio waves transmitted on the downlink radio channel in the system wherein banning applies. The RF receiver 501 extracts frequency components falling within the set range out of the radio waves input to the antenna 111 and adjusts the total power of the frequency components by AGC. The RF receiver converts the received frequency components to a baseband frequency which is, then, passed to the matched filter 502. Now, the preparation stage is complete.

When seeking a downlink pilot signal as per WCDMA standards, the following procedure makes it possible to seek it efficiently: first, detect the start of a slot by seeking a primary synchronization signal, then seek a secondary synchronization signal in the slot, thereby detecting the start of a frame, and limit the number of scrambling code candidates, and finally, seek a pilot signal, using the results.

First, a primary synchronization code is set in the matched filter 502. The matched filter 502 generates primary synchronization codes of different timings in one chip time steps off the set primary synchronization code, based on the first pulse output by the timer 514. The matched filter multiplies a signal incoming from the RF receiver 501 by each of the primary synchronization codes of different timings and passes the thus multiplied signals to the received power calculator 503. The received power calculator 503 adds the signals incoming from the matched filter 502 for a predetermined period (256 chips are suitable as per WCDMA standards) and calculates power values corresponding to the primary synchronization codes of different timings. If a power value equal to or greater than the threshold by which reception of a primary synchronization signal is determined exists among the thus calculated power values, it can be inferred that a primary synchronization signal matching the greater power primary synchronization code of a particular timing has been received. Thus, it can be inferred that a slot starting at the particular time exists. That timing can be determined by the number of chips relative to the second pulse output by the timer 514 and the start position of the slot can be represented by the number of chips. Because the primary synchronization code as per WCDMA standards repeats the same pattern after 2560 chips, by generating a set of primary synchronization codes corresponding to 2560 timing values in units of chips and executing the above calculation, a slot start position can be sought for all radio signals input to the antenna 111. Further seek process is performed for a predetermined number of signals of greater received power relative to the greatest received power.

Next, seeking a secondary synchronization signal is performed, based on the slot start timing detected with the primary synchronization signal. However, due to change of the path length of radio waves as the train runs, there is a possibility of the start of a slot being shifted by ±1 chip. Thus, using a total of three timing values, that is, the timing of the start of the detected slot and timings of ±1 chip off the start position, seeking is performed. As per WCDMA standards, a total of 16 secondary synchronization codes are used and a secondary synchronization signal in each slot is coded by any of the 16 codes. Using a total of 48 codes, combinations of three timing values and 16 secondary synchronization codes, the matched filter 502 multiples a signal incoming from the RF receiver 501 by each of the 48 codes and passes the thus multiplied signals to the received power calculator 503.

The received power calculator 503 calculates power values in the same way as does in the primary synchronization signal seeking step. If the greatest power value among the thus calculated 48 power values is equal to or greater than the threshold by which reception of a secondary synchronization signal is determined, it can be inferred that a radio signal sent after coded by the secondary synchronization code corresponding to the power value exists. By repeating the above process for 15 slots and comparing the results with the WCDMA standards, the start of a frame is determined and 512 scrambling codes can be limited to eight codes.

If the greatest power value among the 48 power values calculated per slot corresponds to a secondary synchronization code with timing of +1 chip (or −1 chip) off the slot start, further process is performed, assuming that the slot start shifted by +1 chip (or −1 chip). If the slot start shifted by ±1 chip agrees with the start of another slot sought, the seek process for this block of radio signals received is aborted.

If all the 48 power values are less than the threshold, received power calculation is executed for another slot that follows in the same way. If the calculated 48 power values are less than the threshold again, the seek process for this block of radio signals received is aborted. This is because the synchronization signal as per WCDMA standards may be sent by two antennas of a base station alternately. Due to multiple interference of radio waves, sometimes, the received power of radio waves sent from one antenna is low, whereas the received power of radio waves sent from the other antenna is sufficiently high. The received power per slot changes between low and high levels. Thus, if the received power is low for one slot, there is a possibility of receiving radio waves in the next slot sent from the other antenna. However, if the received power of two successive slots is low, it is likely that the mobile terminal has become unable to receive. Thus, when the received power of two successive slots is low, the seek process for the block of radio signals received is aborted.

Next, eight limited scrambling codes and a channelization code of primary common pilot channel are set in the matched filter 502. Using a total of 24 scrambling codes, eight scrambling codes plus the same scrambling codes shifted by ±1 chip off the frame start, the matched filter multiples a signal incoming from the RF receiver 501 by each of the 24 codes and the channelization code and passes the thus multiplied signals to the received power calculator 503.

The received power calculator 503 calculates power value every 256 chips in the same way as does in the synchronization signal seeking step. As per WCDMA standards, the modulation pattern of the common pilot channel output from one antenna does not change, but that output from the other antenna changes every 256 chips or 512 chips. Thus, by power calculation every 256 chips, the received power of the primary common pilot signal can be calculated without taking modulation patterns into consideration. If the greatest power value among the 24 power values calculated by the received power calculator 503 is equal to or greater than the threshold by which reception of a pilot signal is determined, it can be inferred that a pilot signal sent after coded by the scrambling code corresponding to the power value exists. The above process is repeated several times. If the same scrambling code is selected at a high probability, the standards of the sought pilot signal for use in the system wherein banning applies (in this embodiment, WCDMA standards), carrier frequencies, detected scrambling code, and the start of the frame (hereinafter, they are referred to as pilot signal specifications) are stored into the memory 513.

As is the case for the secondary synchronization signal seeking step, if the greatest power value calculated per slot corresponds to a scrambling code with timing of ±1 chip (or −1 chip) off the frame start, further process is performed, assuming that the frame start shifted by ±1 chip (or −1 chip).

When storing pilot signal specifications into the memory 513, it is checked whether the same pilot signal specifications have been stored. Unless such specifications are stored, the pilot signal specifications, received power value, and the time at which the pilot signal was received are stored. If such specifications have been stored, the received power value and the time at which the pilot signal was received are updated. The same seek process as described above is performed for the next block of radio signals received. Once the seek process has been completed for all blocks of radio signals received, the seek process is performed serially for another system wherein banning applies as per other standards. Once the seek process has been completed for all other systems, the same seek process is repeated for the first system wherein banning applies.

During the above seek process, in a time sharing manner, the seek results stored in the memory 513 are updated periodically. The update frequency is at least once for time required for the train to run a half the distance that radio waves travel in one chip time (this distance is about 39 meters as per WCDMA standards). Among all sets of pilot signal specifications stored in the memory 513, for the sets in which the last received power value is equal to or greater than the threshold by which pilot signal reception is determined (hereinafter referred to as, simply, the threshold), this update operation updates the received power value and the time at which the pilot signal was received, stored in the memory 513, reflecting the results of calculating received power values, using combination of limited scrambling codes, the same scrambling codes shifted by ±1 chip, and the start of the frame. If the power values corresponding to the scrambling codes shifted by ±1 chip are greater than those corresponding to the scrambling codes not shifted, the start of the frame is updated, accordingly. If a set of pilot signal specifications obtained as the result of updating the start of the frame agrees with another set of pilot signal specifications which have been stored, the one with older update time is deleted.

Then, generating pseudo pilot signals, based on the pilot signal specifications stored in the memory 513 and sending the pseudo pilot signals from the antenna 112 and 212 are performed. The seek operation can be performed in a time sharing manner for different systems wherein banning applies, respectively, according to different standards, for which one set of the matched filter 502 and the received power calculator 503 only must be prepared. For sending pseudo pilot signals, however, it is desirable to prepare the timers 514, pilot signal generators 521, and modulators 522 for each system wherein banning applies and sending these signals constantly.

The pilot signal generator 521 generates pilot signals, based on the pilot signal specifications stored in the memory 513 and passes the pilot signals to the modulator 522. Allowing for signal delay by passing through the RF receiver 501, modulator 522, combiner 523, and RF transmitter 524, the pilot signal generator generates pilot signals at timing so that the start of the frame of these signals will be output from the antenna 112 several chips earlier than the time at which the start of the frame of the real pilot signal sent from the base station 130 is input to the antenna 111. The power of these signals is set in proportion to the received power (the threshold if this power is less than the threshold) of the pilot signal, stored in the memory 513. The signals the pilot signal generator 521 passes to the modulator 522 are the above pilot signal plus several pilot signals with different timing values gradually delayed in one chip steps relative to the first one. Thus, a pseudo pilot signal shifted within one chip off the real pilot signal, together with several pseudo pilot signals earlier than the first one, will be generated.

If the number of sets of pilot signal specifications stored in the memory 513 exceeds the number of pseudo pilot signals that can be generated by the pilot signal generator 521, the pilot signal generator generates a maximum number of pseudo pilot signals that can be generated, starting with the pilot signal of latest update time stored in the memory 513 and going back to the past in order.

The modulator 522 generates a carrier with a frequency that has been stored in the memory 513, modulates the carrier with the signal passed from the pilot generator 521, and passes the modulated signal to the combiner 523. The combiner 523 adds all RF signals passed from the modulator 522 and passes a resultant signal to the RF transmitters 524 and 525. The RF transmitter 524 transmits the RF signal passed from the combiner 523 via the antenna 112. The RF transmitter 525 also transmits the RF signal passed from the combiner 523 via the antenna 212. However, the RF transmitter 525 changes the signal delay in time with the pulse sent from the timer 526. The timer 526 generates a pulse of about 1 kHz and sends it to the RF transmitter 525. As described above, the pseudo repeater 110 can be realized.

In this embodiment, when the train having the pseudo repeater 110 per coach returns to the car barn or arrives in a terminal station or at other suitable time, the pilot signal specifications stored in the memory 513 can be read by remote control via the DSP 511 and data terminal 512. From this data, the types, downlink scrambling codes, and other attributes of base stations in the system(s) wherein banning applies along the railroad line on which the train traveled can be known. Before the train resumes a shuttle service or the next train leaves, it is possible to set the seek process to be performed for a particular base station as a first priority so that seeking can be performed efficiently.

By the function or reading the pilot signal specifications stored in the memory 513, even if a wireless communications system of unknown specifications exist, it is possible to narrow down the unknown field of the specifications. By presuming the specifications of an unknown wireless communications system from many types of specifications open to the public and modifications thereto and putting the pseudo repeater 110 into operation except the pseudo pilot signal generating functionality (that is, the part comprised of the pilot signal generator 521, modulator 522, combiner 523, RF transmitters 524 and 525), it can be investigated whether base stations of the presumed specifications exist. The investigation results are stored into the memory 513 so that they can be read by remote control. Based on the investigation results, by investigating other specifications and repeating, it is possible to narrow down the unidentified field of an unknown wireless communications system.

Figure 6:
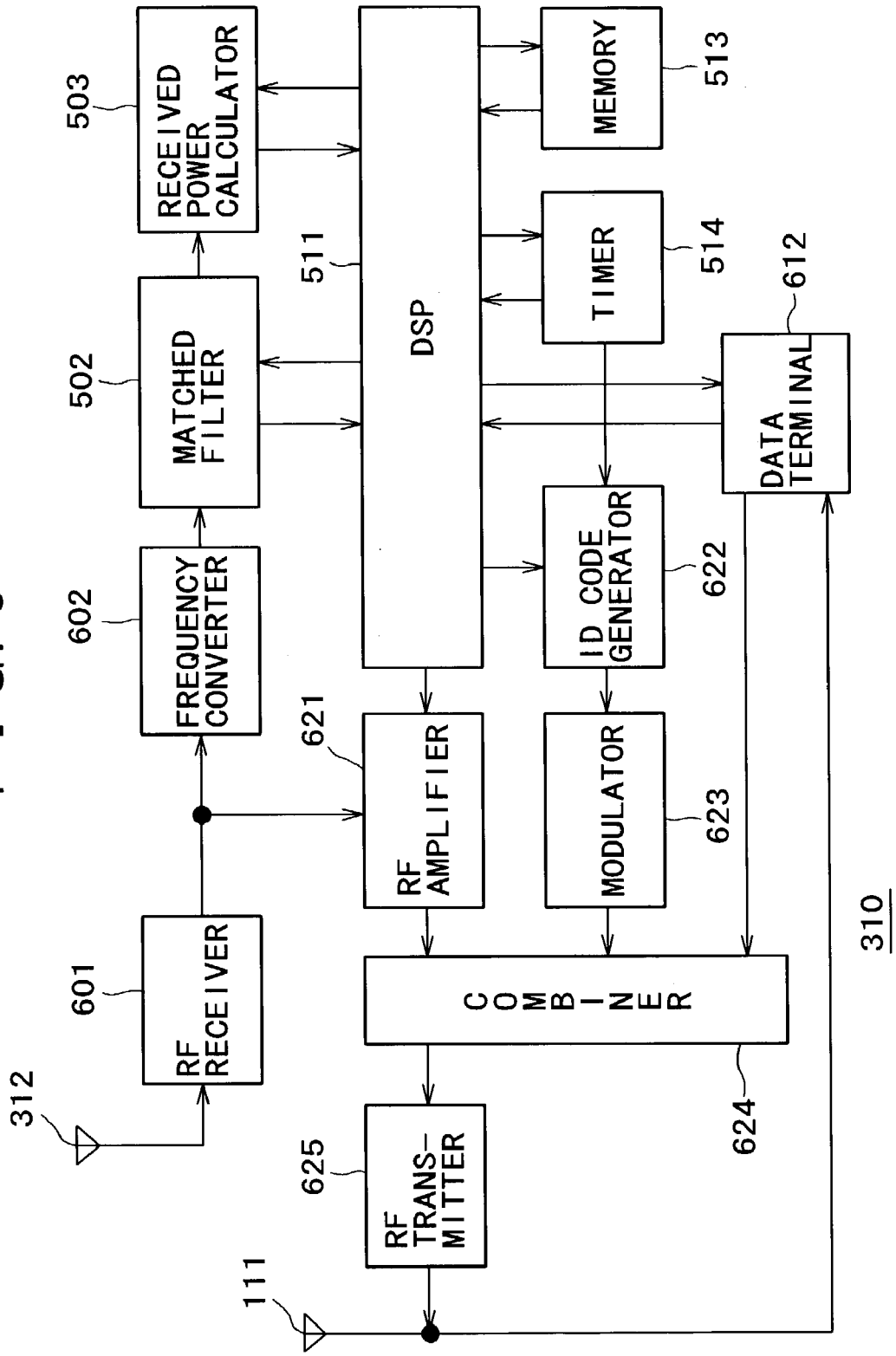
FIG. 6 is a block diagram illustrating a further detailed configuration of one component used in the embodiment of FIG. 3.

A preferred embodiment of configuring the repeater 310 is shown in FIG. 6. As is shown in FIG. 6, reference numeral 601 denotes an RF receiver, 602 denotes a frequency converter, 612 denotes a data terminal, 621 denotes an RF amplifier, 622 denotes a identification (hereinafter abbreviated to ID) code generator, 623 denotes a modulator, 624 denotes a combiner, and 625 denotes an RF transmitter.

The data terminal 612, a component of the repeater of this embodiment, is able to use a wireless communications system that accommodates the mobile terminal 120 and has functionality of communicating with the base station 330. In addition to the functionality as a normal data terminal for point-to-point data communication with a remote control station via the base station 330, the data terminal is provided with a function of receiving signals broadcasted from the base station 330.

The RF receiver 601 in FIG. 6 extracts frequency components within a band of radio waves transmitted on the uplink radio channel from the mobile terminal 120 to the base station 330 and passes the frequency components as is to the frequency converter 602 and RF amplifier 621. The frequency converter 602 adjusts the power of signals passed from the RF receiver 601 by AGC and converts the signals to a baseband frequency which is then passed to the matched filter 502. The RF amplifier 621 amplifies signals passed from the RF receiver 601 and passes the amplified signals to the combiner 624. The DSP 511 controls the rate of amplification. The ID code generator 622 generates a special code that the mobile terminal 120 does not sent and passes the code to the modulator 623. The modulator 623 modulates a carrier of the same frequency as the frequency of radio waves on the uplink radio channel from the mobile terminal 120 and data terminal 612 with the signal passed from the ID code generator 622 and passes the modulated signal to the combiner 624. The combiner 624 adds all RF signals passed from the data terminal 612, RF amplifier 621, and modulator 623 and passes a resultant signal to the RF transmitter 625. The RF transmitter 625 transmits the RF signal passed from the combiner 624 via the antenna 111.

Immediately after being powered on and stabilized, the repeater 310 sends a signal of request for information required for its initialization from the DSP 511 via the data terminal 612 to the remote control station. The remote control station sends data encryption and decryption keys, information for generating ID code, and information for setting communication modes according to attributes banned or permitted inside the coach of the train to the data terminals 612 of the repeaters 310 installed in each coach of the train by point-to-point communication. As required, the remote control station sends information for setting or modifying first through third thresholds which will be described later. The encryption/description keys and ID code are the same for all coaches, but whether to ban or permit communication modes according to attributes is separately arranged for each coach. The same pair of encryption/decryption keys is set in each base station 330 beforehand.

On the repeater 310 installed in each coach, the data terminal 612 receives and stores the above-mentioned information into the memory 513 via the DSP 511. Moreover, based on the specifications of the communications system between the mobile terminal 120 and the base station 330, the timer 514 is set to output the first pulse every one chip time for radio signals on the uplink data channel sent from the mobile terminal and the second pulse every one frame time.

Then, the DSP 511 reads and sets the information for generating ID code, which has been stored in the memory 513, in the ID code generator 622. Using this information and the first pulse sent from the timer 514, the ID code generator 622 generates ID code. An ID signal to the ID code is passed through the modulator 623 and combiner 624 to the RF transmitter 625 from which it is sent via the antenna 111. The repeaters 310 at other coaches all send the same ID signal.

The DSP 511 sets the ID code in the matched filter 502 periodically (for example, every 100 milliseconds). The matched filter 502 and the received power calculator 503 seek this ID signal in the same procedure that the matched filter 502 and the received power calculator 503 in the embodiment of FIG. 5 seek a primary synchronization signal. When the power value of the ID signal is equal to or greater than the first threshold that has been preset, it can be determined that the antenna 312 is receiving radio waves on the uplink radio channel 350 from the repeater 310 installed in another coach. In that event, the rate of amplification of the RF amplifier 621 must be lowered, according to the power value, to prevent oscillation with the repeater installed in another coach.

Then, the data terminal 612 receives information periodically broadcasted from the base station transfers the information to the DSP 511. This information comprises, for all mobile terminals being communicating with the base station 330, the mobile terminal's telephone number, the attribute of the communication, and information for generating a scrambling code on the uplink radio channel from the mobile terminal. The information is encrypted by the key transmitted at initialization and broadcasted. The DSP 511 decrypts the information with the decryption key and stores the decrypted information into the memory 513. Each time broadcasted information to update the above-mentioned information is received, the DSP updates the information stored in the memory 513. Moreover, the DSP calculates an interval between the time at which the start of a frame transmitted on the downlink radio channel 150 sent from the base station 330 arrives at the antenna 111 and the time at which the timer 514 outputs the second pulse as how many chips relative to the second pulse, based on the timing at which the data terminal 612 receives radio signals from the base station 330 and stores the calculated interval into the memory 513.

Using the information to set communication modes according to attributes banned or permitted, stored in the memory 513 at initialization, the DSP then selects a communication mode of attribute banned inside the coach out of the modes of communication provided by the base station 330. Selecting one communication mode serially, the DSP sets uplink scrambling codes for the communication mode in the matched filter 502. The matched filter 502 and received power calculator 503 seek a pilot signal scrambled by the scrambling codes in the same procedure that the matched filter 502 and received power calculator 503 in the embodiment of FIG. 5 seek a pilot signal. When the power value of the pilot signal is less than the second threshold that has been preset, it can be inferred that the antenna 312 is not receiving radio waves for the communication mode on the uplink radio channel. In that event, the seek process is performed for another mode of communication.

After seeking a pilot signal, when its power value is equal to or greater than the above-mentioned second threshold, it can be determined that the antenna 312 is receiving radio waves for the communication mode on the uplink radio channel. In this case, after setting ID code in the matched filter 502, seeking the ID signal is performed. When the power value of the ID signal is less than the third threshold that has been preset, it is determined that there is no possibility that the antenna 312 is receiving radio waves on the uplink radio channel 350 from the repeater 310 installed in another coach. After repeating the pilot signal seeking step and the ID signal seeking step a few times, if it is determined that the antenna 312 is receiving radio waves for the communication mode on the uplink radio channel, but not receiving radio waves on the uplink radio channel from the repeater 310 installed in another coach, it can be determined that a mobile terminal engaged in the communication mode exists in the coach 100. In that event, the DSP 511 sends the base station 330 via the data terminal 612 the telephone number of the mobile terminal engaged in the communication, a signal of request to discontinue the communication, and information about the rule banning the communication in the train coach.

The time at which signal on the downlink radio channel 150 sent from the base station 330 arrives at the antenna 111 is considered substantially equal to the time at which the same signal arrives at the antenna 121 of the mobile terminal 120. Difference between the time at which the start of a frame transmitted on the downlink radio channel 150 sent from the base station 330 arrives at the antenna 121 of the mobile terminal 120 and the time at which the mobile terminal 120 sends the start of a frame on the uplink radio channel from the antenna 121 is normally determined by the specifications. Moreover, because the inner space of the coach 100 is narrow, time after sending radio waves on the uplink radio channel from the antenna 121 until the radio waves have arrived at the antenna 312 is considered practically negligible. Furthermore, as described above, difference between the time at which the start of a frame transmitted on the downlink radio channel 150 sent from the base station 330 arrives at the antenna 111 and the time at which the timer 514 outputs the second pulse is stored in the memory 513.

Thus, the range of time over which the matched filter 502 is to seek a pilot signal can be limited to a period relative to the time at which the timer 514 outputs the second pulse, and therefore, quick and efficient pilot seeking can be performed.

Figure 7:
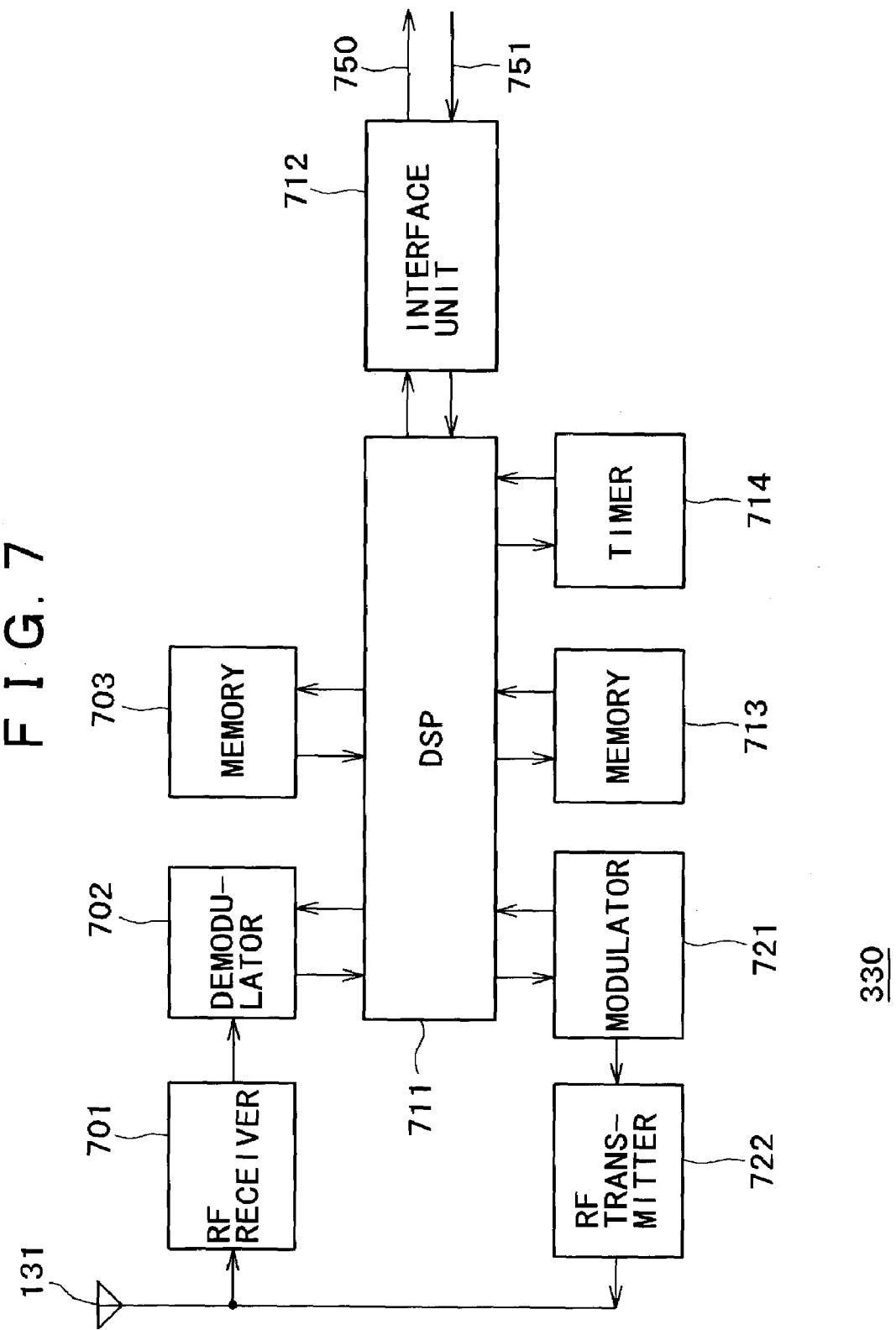
FIG. 7 is a block diagram illustrating a further detailed configuration of another component used in the embodiment of FIG. 3.

A preferred embodiment of configuring the base station 330 is shown in FIG. 7. As is shown in FIG. 7, reference numeral 701 denotes an RF receiver, 702 denotes a demodulator, 703 denotes a memory for storing software for implementing functions as a normal base station, 711 denotes DSP, 712 denotes an interface unit, 713 denotes a memory for storing software required for implementing the functions of the present invention, 714 denotes a timer to trigger the DSP 711, 721 denotes a modulator, and 722 denotes an RF transmitter 722. Reference numeral 750 and 751 denote signals for connection and communication with the base station control unit. The memories 703 and 713 may be physically provided as memory units on the same semiconductor chip. Via the interface unit 712, the DSP 711 sends the base station control unit the signal 750 and receives the signal 751. The base station receives radio waves transmitted on the uplink radio channels from the mobile terminal 120 and data terminal 612 via the antenna 131. The RF receiver 701 extracts frequency components in a required frequency band and converts them to a baseband frequency and the demodulator 702 demodulates the baseband frequency signals to signals per channel. The modulator 721 combines downlink signals to send to the mobile terminals with carriers and the output signals are transmitted from the RF transmitter 722 via the antenna 131. The above are basic functions of the base station.

The base station 330 receives information defining an encryption key to be used when broadcasting information to the repeaters 310, attributes of communication, and information for setting the timer 714 as part of the signal 751 from the remote control station via the base station control unit. The DSP 711 stores the above-mentioned information into the memory 713. Based on this information, the DSP 711 sets the timer 714 to output the first pulse at given time intervals (for example, every 1 second) and the second pulse at longer time intervals (for example, every 10 seconds). Each time the timer 714 outputs the first pulse, the DSP 711 stores the telephone number, information for generating uplink scrambling codes, and the attribute of communication for the mobile terminals being communicating with the base station 330 at that time into the memory 713. If change is made to the last data, the DSP encrypts the updated data with the above-mentioned key and the base station broadcasts the update data to the data terminals 612 of the repeaters 310. When the timer 714 outputs the second pulse, the base station broadcasts all data for the mobile terminals stored in the memory 713 including unchanged data. When the base station receives a signal for request to discontinue communication with a certain mobile terminal from the data terminal 612 of a repeater 310, the DSP 711 sends information about the rule of banning the communication of that kind to the mobile terminal and the other end of the communication path. After the elapse of a predetermined time (for example, 3 seconds), the base station disconnects the communication path.

A preferred embodiment of configuring the moving base station 410 is shown in FIG. 8. As is shown in FIG. 8, reference numeral 801 denotes an RF receiver for communication with a repeater 430, 802 denotes a demodulator, 821 denotes a modulator, and 822 denotes an RF transmitter. Reference numeral 813 denotes hard disk storage 813.

The moving base station 410 communicates with the mobile terminal 120 as the normal base station does, using the antenna 321, RF receiver 701, demodulator 702, modulator 721, RF transmitter 722, DSP 711, and memory 703. The moving base station 410 communicates with the repeater 430 as common mobile terminals do, using the antenna 111, RF receiver 801 demodulator 802, modulator 821, RF transmitter 822, DSP 711, and memory 713. Immediately after being powered on and stabilized, the moving base station 410 sends a signal of request for information for setting communication modes according to attributes banned or permitted in the coach 100 of the train where the moving base station 410 is installed from the DSP 711 via the modulator 821 and RF transmitter 822 to the remote control station. In response to this request, information sent back from the remote control station is received via the RF receiver 801 and modulator 802 and stored into the memory 713.

When a mobile terminal existing inside the coach 100 is initiating communication, the DSP 711 determines whether the mode of the communication is permitted inside the coach 100, based on the information stored in the memory 713. If it is permitted, the DSP executes the process of initiating the communication; if it is banned, the moving base station sends information about the rule of banning to the mobile terminal. When a mobile terminal, wired telephone, and the like at a remote place is initiating communication with a mobile terminal existing inside the coach 100, the DSP 711 also determines whether the mode of the communication is permitted inside the coach 100, based on the information stored in the memory 713. If it is permitted, the DSP executes the process of initiating the communication; if it is banned, the moving base station sends information about the rule of banning to the mobile terminal initiating the communication When a mobile terminal engaged in communication via another base station is attempting a handover to the moving base station 410 or time of communication using a mobile terminal inside the coach exceeds a predetermined time and, consequently, the communication has changed to an attribute determined to be banned, the moving base station sends information about the rule of banning the communication to both the mobile terminal and the other end of the communication path. After the elapse of a predetermined time (for example, three seconds), the moving base station disconnects the communication path.

The base station control unit 440 broadcasts beforehand information that is frequently accessed in a certain area to all moving base stations 410 existing in the area. The DSP 711 stores this information into the hard disk 813. When a mobile terminal 120 requests the moving base station to send this information, the DSP 711 reads this information from the hard disk 813 and sends it to the mobile terminal 120. In this manner, quantity of data to be communicated between the moving base station 410 and the repeater 430 can be reduced and time after the mobile terminal 120 issues a request to send data until the data has arrived can be shortened.

While the invention was described hereinbefore, assuming that the coach 100 of a train is a space where the use of mobile terminals is banned, the present invention can be implemented in the passenger cars or cabins of public transports such as busses and ships, besides trains. The present invention can also be implemented in public places such as theaters and restaurants, unless a base station of the wireless communications system wherein banning applies exists very near to the place where the invention is to be implemented. Even in this case, the implementation of the present invention is possible if radio waves entering the space or room 100 from the outside are shielded and attenuated.

The embodiment of the present invention shown in FIG. 3 or FIG. 4 assumes that the telephone company or companies cooperate on banning the use of mobile terminals conditionally in specific places. Consequently, a party that plans to implement wireless communication restrictions using equipment according to the present invention must contract with telephone companies, railroad corporations, and the like for their cooperation. If the party will implement the above restrictions in an area where many telephone companies, railroad corporations, and the like exist, the party must make a great number of bilateral contracts with each company, corporation, and the like, which is complication.

A method of coordinating contracts and relations is provided in order to alleviate the above problem and implement the present invention smoothly, and a preferred embodiment hereof is shown in FIG. 9. As is shown in FIG. 9, reference numeral 900 denotes an organization that contracts with telephone companies, railroad corporations, and the like for wireless communication restrictions, 901 denotes a remote control workstation possessed by the organization 900, and 902 denotes hard disk storage 902. Reference numerals 911–913 respectively denote telephone companies under contract with the organization 900, reference number 914 denotes a telephone company not contracted with the organization 900, and reference numerals 921–925 respectively denote by railroad corporations, theater companies, and restaurants under contract with the organization 900 as the parities of pubic transports and facilities. Pubic transports and facilities not contracted with the organization are omitted. Reference numeral 950 denotes bilateral contract relation between the organization 900 and a telephone company and 960 denotes bilateral contract relation between the organization 900 and a party of public transports or facilities.

By the bilateral contracts 950, the telephone companies 911–913 are entitled to use the equipment shown in FIG. 3 or 4 and bound to pay use fees. In addition, they provide information required for implementing wireless communication restrictions.

By the bilateral contracts 960, the public transports and facilities 921–925 are bound to install equipment necessary for implementing wireless communication restrictions of the present invention. In addition, they are bound not to install equipment for making mobile terminals impossible to use, provided by any party other than the organization that they contracted with. In addition, they provide information such as the telephone numbers of the data terminals 512 as constituent parts of the pseudo repeaters 110 installed in each coach or room and the data terminals 612 as constituent parts of repeaters 310 installed in each coach or room, and communication modes according to attributes defined to be banned or permitted in each coach or room. In return for doing this, they receive part of the use fees that the organization received from the telephone companies 911–913 as part or all of the cost for installing the equipment and its maintenance cost.

The organization 900 stores the information provided from the telephone companies 911–913 and the public transports and places 921–925 into the hard disk storage 902. As required, the organization 900 sends setup information or the like from the remote control workstation 901 via telephone circuits or a data communications network and via the base station control units of each telephone company 911–913 to the data terminals 612 of the repeaters 310 or moving base stations 410. In consequence, the telephone companies 911–913 can use the equipment shown in FIG. 3 or 4.

Furthermore, the organization 900 investigates the specifications of the wireless communications system operated in the area by the telephone company 914 not contracted with the organization and stores the obtained specifications data into the hard disk storage 902. The organization sends setup information or the like that enables the conditions for banning the use of mobile terminals to apply to communications as per the above specifications also from the remote control workstation 901 via telephone circuits or a data communications network and via any wireless communications system of one of the telephone companies 911–913 to the data terminals 512 of the pseudo repeaters 100. In consequence, even in the wireless communications system operated by the telephone company 914 not contracted with the organization, mobile terminals are made impossible to use in the coaches or rooms of the public transports and facilities 921–925 with regard to at least some kinds of wireless communications for which the use of mobile terminals should be banned.

The scheme described above avoids the following. In consequence of contracting with the organization 900, the telephone companies 911–913 are put against their interests as compared with the telephone company 914 not contracted with the organization. By contracting the organization 900 only, the telephone companies 911–913 becomes able to use the equipment shown in FIG. 3 or 4 in all coaches or rooms of the public transports and facilities 921–925. By making a contract with a single entity, namely, the organization 900, the public transports and facilities 921–925 can obtain cooperation of a plurality of telephone companies 911–913. The organization 900 consolidates the management and operation for wireless communication restrictions using the remote control workstation 901. Thus, equipment and labor costs can be curtailed in comparison with cases that such management and operation are separately performed by the public transports and facilities 921–925.

The organization 900 may be either an independent corporation or a subsidiary of any of the following: telephone companies 911–913, public transports and facilities 921–925, and companies manufacturing equipment such as repeaters. Alternatively, the organization may be an association comprised of some of the above.

What is claimed is:

1. A wireless communication restriction device for making wireless communications between a base station and a mobile terminal impossible to use in a specific space, said wireless communication restriction device comprising:

a receiver for receiving radio waves transmitted from said base station for at least one mobile terminal;

a processor for seeking a pilot signal out of the received radio waves;

a pseudo pilot signal generator for generating pseudo pilot signals having a different timing from the timing of said pilot signal; and means for emitting radio waves carrying pseudo pilot signals thereby disabling said mobile terminal from communication with said base station.

2. A wireless communication restriction device according to claim 1, further comprising:

a plurality of antennas for emitting radio waves carrying said pseudo pilot signals; and means for changing the intensity and phase of radio waves which are sent from part of the plurality of antennas at regular time intervals.

3. A wireless communication restriction device according to claim 1, further comprising:

a plurality of antennas for emitting radio waves carrying said pseudo pilot signals; and means for making a carrier frequency of radio waves to be sent from a part of the plurality of antennas out of phase with a carrier frequency of radio waves to be sent from another part of the plurality of antennas.

4. A method for restricting wireless communications between a base station and a mobile terminal in a specific space, said method comprising the steps of:

installing a wireless communication restriction device which restricts wireless communications in said specific space;

installing a repeater which relays radio waves for communication between a mobile terminal and a base station in said specific space;

arranging said repeater to keep the communication on between a mobile terminal and a particular base station without regard to restriction on wireless communications placed by said wireless communication restriction device; and emitting by said wireless communication restriction device pseudo pilot signals at different timings from a timing of a pilot signal that is sent from said base station thereby preventing said mobile terminal from establishing or keeping channel synchronization with said base station and thus banning wireless communications in said specific space.

5. A method for restricting wireless communications between a base station and a mobile terminal in a specific space, said method comprising the steps of:

receiving and determining a timing of a pilot signal that is sent from a first base station;

emitting pseudo pilot signals to be transmitted at different timings from the timing of said pilot signal, thus restraining a mobile terminal from communicating with the first base station; and relaying radio waves for communication between a second base station and a mobile terminal and restraining a mobile terminal from communicating with the second base station in said specific space, according to the kind of communication.

\* \* \* \* \*